United States Patent
Rodet et al.

(10) Patent No.: US 6,920,240 B2
(45) Date of Patent: Jul. 19, 2005

(54) METHOD FOR ACCELERATED RECONSTRUCTION OF A THREE-DIMENSIONAL IMAGE

(75) Inventors: Thomas Rodet, Grenable (FR); Pierre Grangeat, Saint Ismier (FR); Laurent Desbat, Grenoble (FR)

(73) Assignee: Commissariat a l'Energie Atomique (FR)

( * ) Notice: Subject to any disclaimer, the term of this patent is extended or adjusted under 35 U.S.C. 154(b) by 697 days.

(21) Appl. No.: 10/048,336

(22) PCT Filed: Jun. 7, 2001

(86) PCT No.: PCT/FR01/01753

§ 371 (c)(1),
(2), (4) Date: Jan. 29, 2002

(87) PCT Pub. No.: WO01/95254

PCT Pub. Date: Dec. 13, 2001

(65) Prior Publication Data

US 2002/0131650 A1 Sep. 19, 2002

(30) Foreign Application Priority Data

Jun. 7, 2000 (FR) .......................................... 00 07278

(51) Int. Cl.[7] .................................................. G06K 9/00
(52) U.S. Cl. ............................ 382/131; 382/280; 378/4
(58) Field of Search ............................... 382/128, 129, 382/131, 130, 132, 133, 154, 156, 169, 194, 203, 205, 210, 233, 250, 260, 274, 277, 278, 280, 298, 305; 356/39; 378/4, 15, 65; 600/440, 443; 715/740; 250/370.09

(56) References Cited

U.S. PATENT DOCUMENTS

| 4,991,093 A | * | 2/1991 | Roberge et al. .............. 382/131 |
| 5,628,320 A | * | 5/1997 | Teo ............................. 600/443 |
| 5,907,593 A | * | 5/1999 | Hsieh et al. .................... 378/4 |
| 5,970,182 A | * | 10/1999 | Goris .......................... 382/278 |
| 6,240,157 B1 | * | 5/2001 | Danielsson ................... 378/15 |
| 6,272,200 B1 | * | 8/2001 | Pan et al. ...................... 378/15 |
| 6,282,257 B1 | * | 8/2001 | Basu et al. .................... 378/15 |
| 6,307,911 B1 | * | 10/2001 | Basu et al. .................... 378/15 |
| 6,674,449 B1 | * | 1/2004 | Banks et al. ................ 715/740 |
| 6,842,502 B2 | * | 1/2005 | Jaffray et al. ................. 378/65 |

FOREIGN PATENT DOCUMENTS

WO    WO 00/19902    4/2000

OTHER PUBLICATIONS

Delany, Alexander H. and Yoram Bresler. "Multiresolution Tomographic Reconstruction Using Wavelets." IEEE Transactions on Image Processing, Jun. 4, 1995, pp. 799–813.

* cited by examiner

*Primary Examiner*—Yon J. Couso
*Assistant Examiner*—Seyed Azarian
(74) *Attorney, Agent, or Firm*—Hayes Soloway P.C.

(57) ABSTRACT

Sets of projections of measurements through an object (1) the image of which is to be represented, undergo Fourier transforms before being broken down into blocks according to cutoff frequencies. The blocks are separately reconstructed in order to form a series of thumbnail images of the object, which are then combined in order to reconstruct the final image. The reconstruction calculations on the thumbnail images are rapid and often a large portion of the blocks will be discarded, notably those which are at high frequencies, whereby their contribution may frequently be neglected as well as the noise effects which accumulate therein.

The invention is applied to medical or industrial tomography methods and is of larger interest for mobile objects, the movement of which may be estimated and compensated.

8 Claims, 4 Drawing Sheets

METHOD FOR ACCELERATED RECONSTRUCTION OF A THREE-DIMENSIONAL IMAGE

BACKGROUND OF THE INVENTION

The object of this invention is an accelerated method for reconstructing a three-dimensional image which is based on a frequency analysis.

Methods for reconstructing images by tomography involve the establishment of projections, measured by the detectors of a network, which are the sum of the property to be represented on the image along the rays crossing the object and ending up at the detector. In attenuation tomography, the total absorption of a ray emitted by an external source through the object to be represented is measured; in emission tomography, the object has been made emissive of a radiation, the projections of which represent sums along a respective collimation ray associated with each detector, for a determined measurement time. The invention is indistinctly applied to all these methods for establishing projections and is only related to their subsequent processing.

A linear equation system of a very large size expresses the total value, as measured at each projection ray, of the absorption or emission property to be represented as a function of the values that it assumes on the points of the object passing through this ray. Inversion of this system enables the value of the property to be calculated at each point of the object, and to rebuild the wanted image, and methods called algebraic methods have been devised for proceeding in this way. However, algebraic methods become very awkward when images with fine resolution are required, computation times being excessive, and that is why so-called analytical methods have been developed wherein the projections undergo digital processing called filtering, after which they are combined according to a so-called back projection method which provides the value of the wanted property at each point of the object according to the projections passing through this point. These methods are now popular, but they also require a large volume of computations which one would like to reduce. The invention is a means for meeting this wish.

SUMMARY OF THE INVENTION

It relates to a method for reconstructing a three-dimensional image from two-dimensional projections of the image, comprising digital filtering of the projections, then a back projection of the filtered projections, characterized in that it consists, after having Fourier-transformed the projections, of breaking down said transform into blocks delimited by cutoff frequencies, of applying a reverse Fourier-transform onto the blocks, the back projection being performed on each of said filtered projections associated with the blocks, thereby obtaining thumbnail images, and of combining the thumbnail images in order to obtain the image. However, it is advantageous to only treat in this way projections which are not zero.

The thumbnail images may be combined with one another after having undergone a Fourier transform; the image is then obtained by applying a reverse Fourier transform.

The thumbnail images correspond to sub-sampled portions of the image. More specifically, they only express the portions of the total information contained in the projections, but which relate to the entire image to be reconstructed. However, as back projections are separately performed for each of the thumbnail images, a uniform reconstruction of the thumbnail images enables identical back projection computations to be applied to each of them, which saves a significant volume of computations as the thumbnail images have less points than the total image.

Among the ideas already suggested for reducing computing times in tomography, the article "Fast Spatio-Temporal Image Reconstruction for Dynamic PET" by Wernick at al., may be mentioned wherein a Karhunen-Loève transform is performed on the projections of a sequence of images and the least significant terms of the transform are eliminated. The resolution method is an algebraic method, and this article is only related to the reconstructions of images from a mobile object. The Karhunen-Loève transform is costly in computing time and is only interesting for situations where computations are extremely abundant. U.S. Pat. No. 5,907,593 may also be mentioned wherein sub-samplings of the number of views and sub-samplings on the projections are suggested for accelerating computation times.

In other alternative embodiments of the invention, which may be considered concurrently, the computations for the image reconstruction may be reduced by simplifications and information associated with certain thumbnail images may even be completely neglected. In other further alternative embodiments of the method, special information, notably as defined beforehand, may be used for contributing to suitable progress in computations. An estimated global movement of the object may thereby be taken into account.

BRIEF DESCRIPTION OF THE DRAWING

The invention will now be described by means of the figures, wherein.

DETAIL DESCRIPTION

Figure 1:
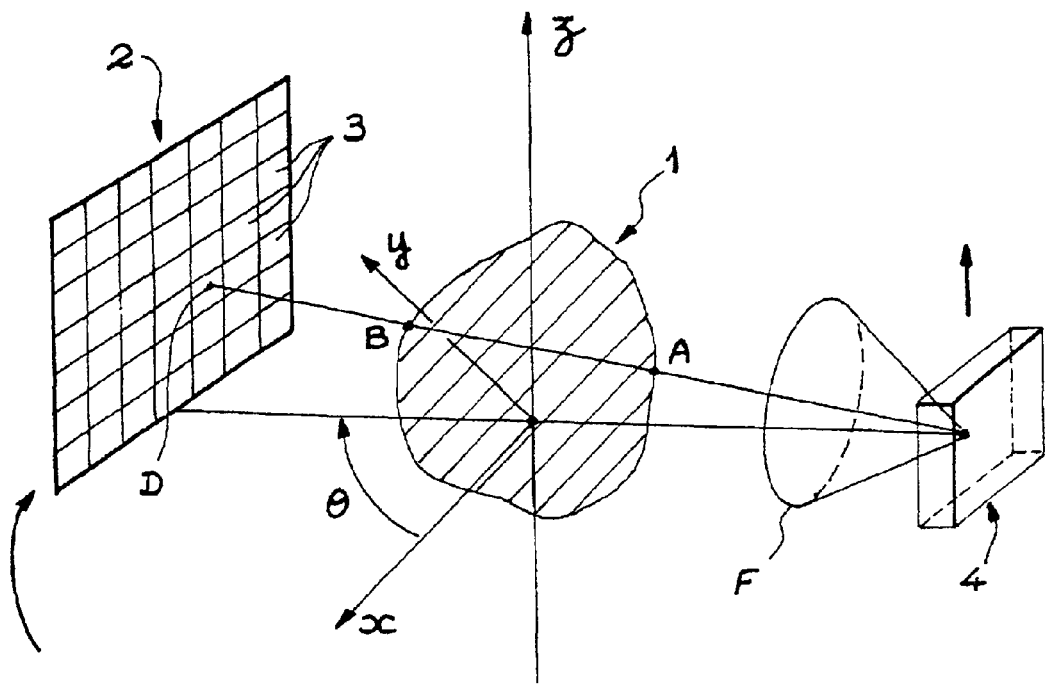
FIG. 1 illustrates the apparatus for obtaining the projections.
Figure 2:
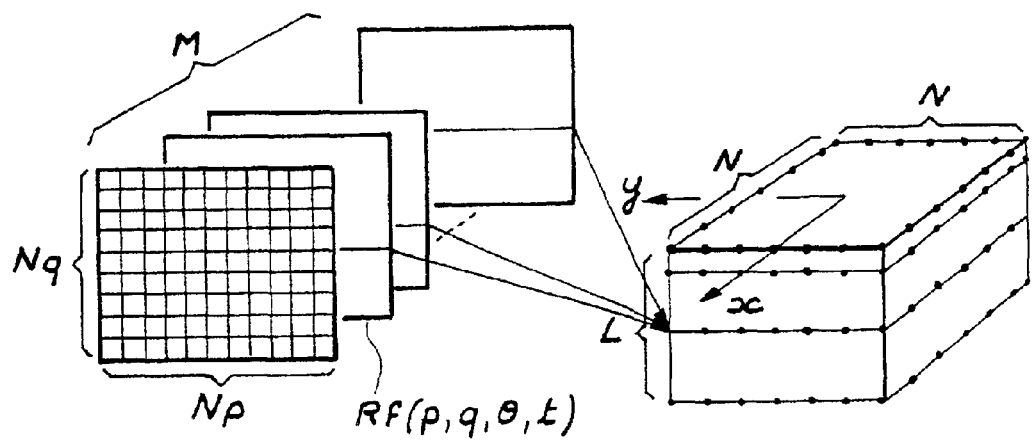
FIG. 2 clarifies the initial informative data and those to be obtained (projections and reconstructed image)

As illustrated in FIG. 1, a two-dimensional network 2 of detectors 3 and a source device 4 are simultaneously mobile around an object 1 to be represented by the image. The emitted radiation may be conical X radiation originating from a point-like focus Detectors 3 are focussed towards focus F, and each of them thereby picks up one ray originating from this focus F and reaching it at point D. The rays used for the reconstruction cross the object 1 between a point A and a point B and are partly absorbed by each point of object 1 which they cross according to the physical nature of this point. The reconstruction problem consists, starting with a set of projections Rf on network 2 taken at angular positions θ of the system and at times t which are usefully considered when object 1 is mobile, of obtaining a three-dimensional image I of the object, which may be considered as a superposition of L two-dimensional cuts of N×N points, stacked on the rotation axis Oz of source 4 and of network 2. As symbolized in FIG. 2, Rf projections are M in number, each comprising Np×Nq values because of the Nq lines and Np columns of measuring detectors 3 in network 2. We shall not elaborate on the details of the filtering and back projection methods, specific to the reconstruction analytical method and which provide conversion of the Rf projections into the image I as they have been described in many other publications and in a few patents, among which French Patent 2,615,619 will be mentioned as the first patent of this research team, and which described a feasible method in its entirety. Also, a rearrangement step is required in the methods with a conical radiation source in order to express the points of the projections in rectangular coordinates (x, y, z) compatible with the representation of the points of the images, which is called a "conical-parallel rearrangement", but this is already known and practiced.

Figure 3:
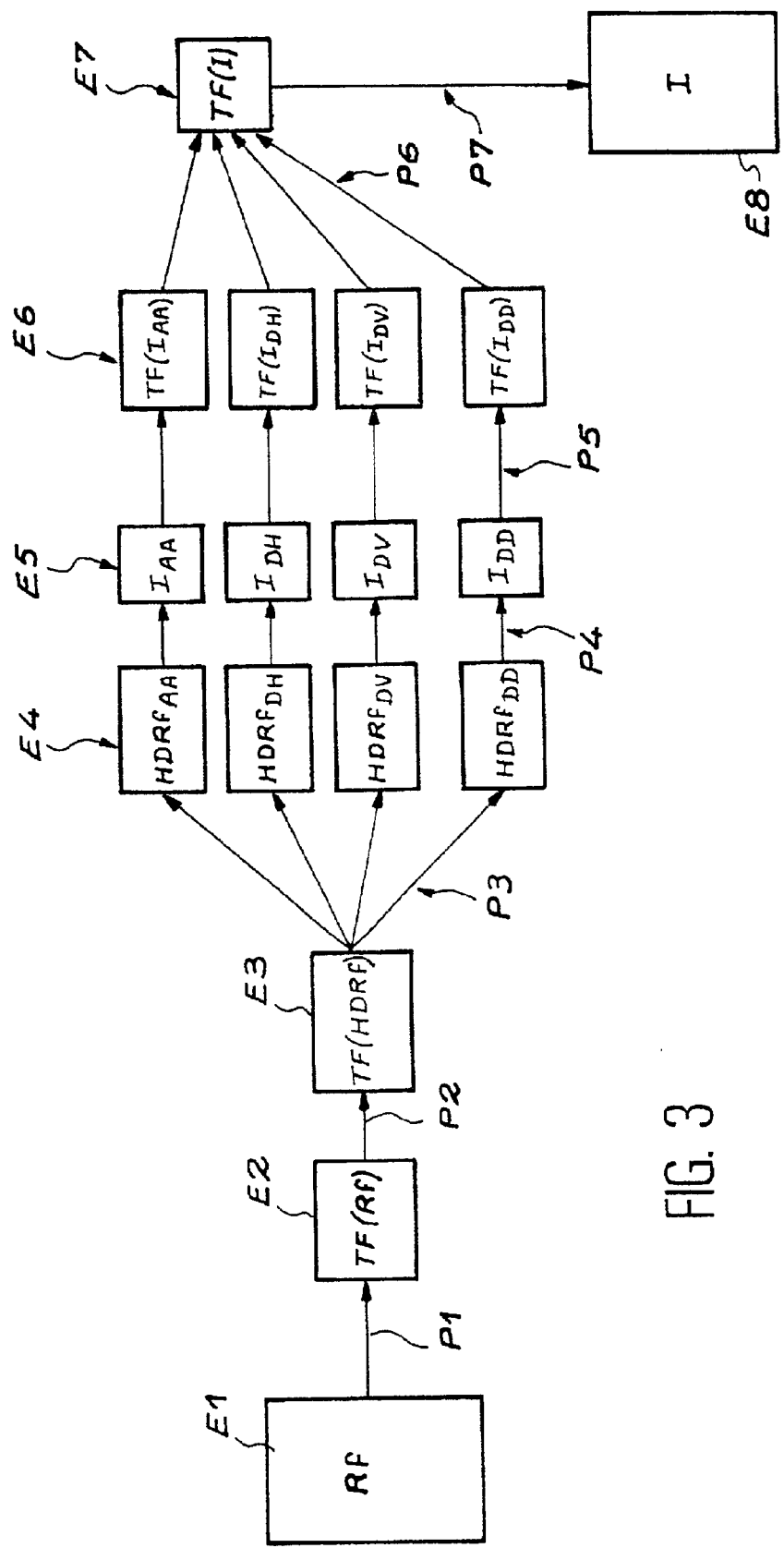
FIG. 3 is a global view of the method.

State E1 appearing at the beginning of this method in FIG. 3 is the set of Rf projections or measurements which have just been described. In step P1 of the method, a spatio-temporal fast Fourier transform (FFT) is applied in order to obtain a set of transformed projections TF (Rf) in state E2 of the system.

Each value measured by one of the detectors 3 is therefore an individual projection which may be characterized by position parameters p and q of the detector 3 in the network 2 with dimensions Np×Nq, by the measurement instant t and the orientation or the angular position θ of the network 2 at this instant t. Parameters θ and t are dependent according to the speed of rotation of the network 2 and if object 1 is mobile, it is advantageous when the measurements are repeated at different instants for each angular position θ of the network 2.

The individual projections Rf (p, q, θ, t) may therefore be distributed into sets of projections distributed according to the value of θ. Within these sets, the horizontal or more generally transaxial (with constant q) lines of the detectors 3 are of interest in order to simplify the problem by considering the image I as a superposition of L horizontal cuts of N×N points, each of which will be obtained by means of projections Rf of the same level, i.e. at the value corresponding to the coordinate q (computations of averages or of interpolation of projections are required if Nq≠L, for passing from q to z, but they are currently practiced in this technique and besides they are elementary, so they will not be discussed herein). The transformed projections TF (Rf) are therefore produced according to both coordinates p and t remaining in the relevant individual projection groups, i.e.:

$$TF(Rf)(v_p, v_q, \theta, v_t) = \int \int R_f(p,q,\theta,t) e^{-2i\pi v_t t} \cdot e^{-2i\pi v_p p} dt dp$$

The transformed projections are characterized by variables $v_t$ and $v_p$, and their number depends on the sampling of the signal.

In the following discussion, only the spatial dimension in $v_p$ of the Fourier transform will be considered, as the temporal dimension in $v_t$ is independent, i.e., only groups of transformed projections TF(Rf) with the same $v_t$ value will be considered.

The transformed projections TF(Rf) thereby grouped together and defined by parameters $v_p$ and θ, are then grouped again according to parameters $v_x$ and $v_y$ according to formulae $v_x = v_p \cos \theta$ and $v_y = v_p \sin \theta$ in two-dimensional matrices with dimensions N×N (if sampling is performed with N frequencies $v_p$) for constant $v_t$ and q. The transformed projections are in fact reclassified according to the main separation axes x and y of the points of the cuts of image I, x and y are perpendicular to one another and to z and angle θ may be counted as starting from x.

The digital filtering required for reconstructing the image, and which is not a characteristic of the present invention, may subsequently be performed in step P2: practically, this consists of applying a ramp filter D, to which may be added an apodization filter H in order to attenuate the significance of high frequencies and noise in particular; this filtering is performed indifferently in the spatial domain of physical projections in state E1 or in the Fourier domain as herein, as the projections have not been changed but only expressed In a different way. State E3 of the system is then symbolized by transformed and filtered projections TFHD (Rf).

Figure 4:
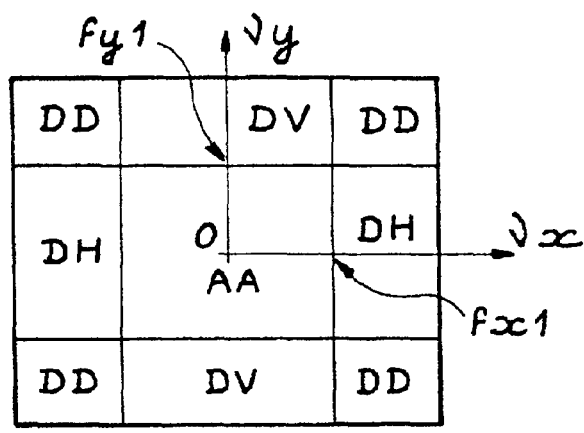
FIGS. 4–8 illustrate the characteristic frequency breakdown of the invention.
Figure 5:
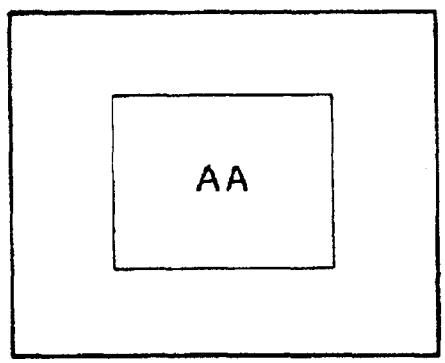
Figure 6:
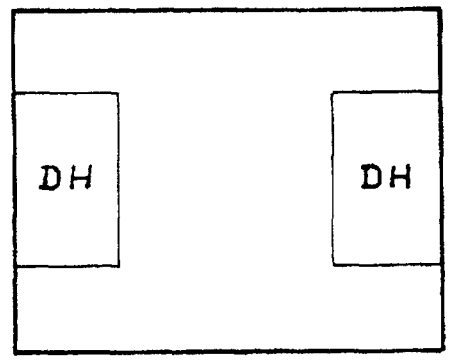
Figure 7:
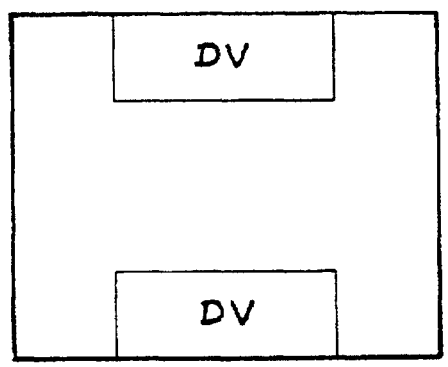
Figure 8:
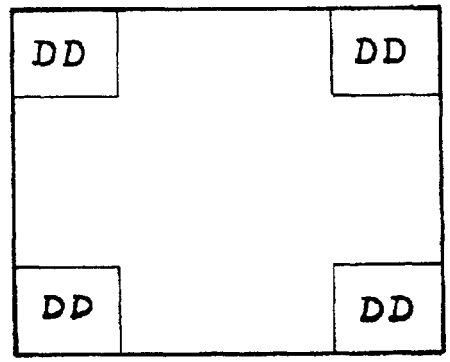

The most characteristic steps of the invention will now be tackled. FIG. 4 illustrates one of the TFHD(Rf) matrices of transformed and filtered projections of state E3. Step P3 which is performed subsequently, is a reverse Fourier transform in the spatial domain after having divided the TFHD (Rf) projections into blocks. Generally speaking, these blocks will have the same size and be separated by cutoff frequencies uniformly distributed on each of the $v_x$ and $v_y$ axes in the entire relevant frequency domain. Here, B=2 and the projections are divided into four on both sides of the cutoff frequencies fx1=N/2 on the $v_x$ axis and fy1=N/2 on the $v_y$ axis. Four portions of transformed and filtered projections are thereby formed which are represented in FIGS. 5, 6, 7 and 8; these portions bear references AA (below fx1 and fy1), DH (on fx1 but below fy1), DV (below fx1 but on fy1) and DD (on fx1 and fy1). Outside these portions, the blocks illustrated in FIGS. 5–8 contain zero values.

A spatial Fourier reverse transform subsequently performed on each of these portions provides four blocks of filtered projections entitled HDRfAA, HDRfDH, HDRfDV and HDRfDD as expressed in FIG. 3. A back projection R# is then performed in step P4, separately on each of the projections in order to obtain four thumbnail images $I_{AA}$, $I_{DH}$, $I_{DV}$ and $I_{DD}$, which are illustrated in state E5. If the blocks of projections have (N/2)×(N/2) frequencies, i.e. $N^2/4$ here, the thumbnail images have $N^2/4$ points. Several comments should now be made.

The blocks of projections and the thumbnail images of states E4 and E5, each have a quarter of the information of the total system and they express different features of the latter. In particular, the thumbnail image $I_{AA}$, issued from low frequency information in the Fourier domain is likely to resemble the global appearance of image I of object 1, rather well, whereas the other thumbnail images are issued from the contribution of high frequencies in the Fourier domain and so they rather express the small details of the image, and noise from the measurements is concentrated therein. Often, these other thumbnail images are only of a lesser significance, and they may frequently be considered as insignificant and computations pertaining to them may be spared. However even if it is preferred to obtain these thumbnail images and use them in the last steps of the method, so that they may contribute to clarifying the image of the object, significant computation time is gained since the back projection time, which is generally significant, is proportional to the number of points (N×N×L) of image I. Here, the back projection is applied to four different blocks, but of reduced volume. Furthermore, this is performed in the same way for each of the four thumbnail images $I_{AA}$, $I_{DH}$, $I_{DV}$ and $I_{DD}$, which have complementary elements of a same image and are divided into as many similar points, so that as a result, the address computations for back projections which give the positions of the points of the thumbnail images on the projections, are the same for all the thumbnail images while being less numerous than for the entire image I to be reconstructed, as each of the thumbnail images contains $B^2$ times less points than image I. Finally, blocks HDRfAA, etc . . . of filtered projections contain a large number of zero projections as they result from cuts in the set of transformed projections in the Fourier domain: the cut frequencies only provide zero values when the reverse transform is performed. Back projections therefore are only directed towards non-zero projections, which further reduces the volume of computations. If there are $B^2$ thumbnail images, they contain B/2 times less projections than the initial image.

The last steps of the method consist in combining thumbnail images for obtaining the wanted image I: a spatial Fourier transform P5 is applied on thumbnail images $I_{AA}$, etc. In order to obtain the transformed thumbnail images $TF(I_{AA})$, in state E6, which are combined by juxtaposing them in the Fourier domain in step P6, obtaining a Fourier transform TF(I) of image I, in step E7; finally in step P7 a time and spatial reverse Fourier transform is applied in order to obtain a sequence of three-dimensional images I of FIG. 2, formed of L N×N cuts at any instant t, the T8 state at different instants of object 1 is assumed to be moving.

It should be emphasized that the temporal Fourier transform and its reverse only makes sense for mobile objects 1 and in the opposite case they may not be performed. However, the invention is still more advantageous for mobile objects, as the affordable compressions of computations, after having dividing the data in blocks, are generally more numerous: most movements are simple, and only occupy a few frequencies $v_t$, close to zero in the spatio-temporal Fourier domain, so that generally all the blocks associated with high temporal frequencies may be eliminated.

An alternative method consists of compressing the computations by introducing preliminary knowledge. If, for example, the object 1 moves, according to a velocity vector, $$\vec{d} = \begin{pmatrix} a \\ b \end{pmatrix},$$

all the corresponding information is found in the plane $av_x+bv_y+v_t=0$ in the Fourier domain. It is therefore sufficient to consider the information contained in this plane in order to reconstruct the global movement of object 1.

Conversely, this information may be eliminated if the intention is not to reconstruct the effect of the global movement in the image sequence.

There is also the possibility of assuming that the object 1 for which the movement is to be computed cannot move with a velocity above a maximum velocity.

It may then be demonstrated that the volume of a cone in the three-dimensional Fourier domain defined by axes ($v_x$, $v_y$, $v_t$) and having as central axis $v_t$, is empty which allows certain blocks to be discarded.

In other alternative methods, a global movement of the object 1 may be estimated by a means independent of the network 2 of detectors 3, such as a pair of stereoscopically mounted cameras. The positions of the individual projections Rf(p, q, θ, t) may be corrected on the network 2 so as to compensate as much as possible this global movement and to provide transformed projections TF(Rf) with a much more reduced frequency domain, which further increases the number of blocks which may be eliminated.

Two-dimensional matrices of transformed projections TF(Rf) defined by axes ($v_x$, $v_y$) and divisions into blocks according to two $v_x$ and $v_y$ cutoff frequency groups were considered earlier. When the temporal Fourier transform is involved, it is at least also advantageous to group the transformed projections into a unique three-dimensional matrix defined by axes ($v_x$, $v_y$, $v_t$); the blocks result from the division of the matrix according to three $v_x$, $v_y$ and $v_t$ cutoff frequency groups. The method basically remains the same but instead of $B^2$ blocks, the three-dimensional matrix is divided into $B^3$ blocks.

It is also possible to group the transformed projections into a four-dimensional matrix defined by axes ($v_x$, $v_y$, $v_z$, $v_t$). The blocks result from division of the matrix according to four $v_x$, $v_y$, $v_z$, and $v_t$ cutoff frequency groups. Also, the method basically remains the same but instead of $B^2$ blocks, there are $B^4$ blocks, the four-dimensional matrix is divided into $B^4$ blocks.

Figure 9:
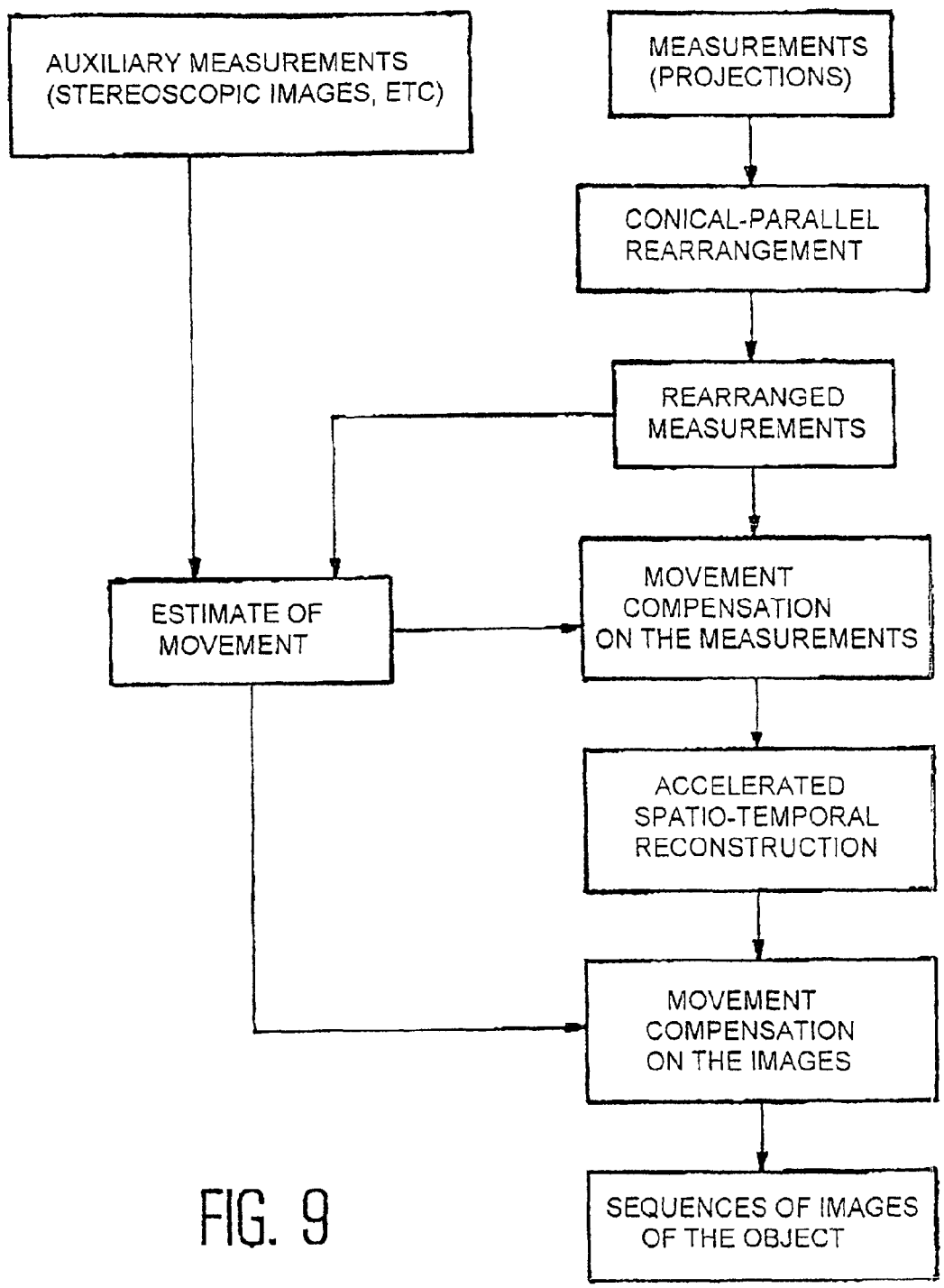
FIG. 9 is a general flowchart of a reconstruction method into which the invention has been integrated.

FIG. 9 is a general flowchart representing all these methods which may be associated with the invention (the accelerated spatio-temporal or optionally spatial reconstruction) in order to obtain a complete method for obtaining a sequence of images. This is provided as a summary and does not provide information specific to the invention; the steps external to the invention have already been explained to a useful extent.

What is claimed is:

1. A method for reconstructing a three-dimensional image from two-dimensional projections of the image, comprising digital filtering of the projections, and then a back-projection of the filtered projections, characterized in that it consists, after having Fourier-transformed the projections, of breaking down said transform into blocks delimited by cutoff frequencies performing a reverse Fourier transform on the blocks, the back projection being performed on each of the projections associated with said blocks, thereby providing thumbnail images, and of combining the thumbnail images in order to obtain the image.

2. The method according to claim 1, characterized in that the thumbnail images are combined after having undergone a Fourier transform and the image is obtained by a reverse Fourier transform.

3. The method according to claim 1, characterized in that the back projections are identical for each of the blocks.

4. The method according to claim 1, further characterized by elimination of blocks according to content-based criteria.

5. The method according to claim 1, characterized in that the direct or reverse Fourier transform comprises a temporal Fourier transform of the projections and a spatial Fourier transform of the projections.

6. The method according to claim 1, characterized in that the image is reconstructed by cuts, the Fourier transform comprising a spatial Fourier transform along the lines of projections parallel to the cuts.

7. The method according to claim 1, characterized in that the spatial Fourier transform along the lines of projections provides spatial frequencies which are associated with orientations of projections converted into two-dimensional spatial frequencies according to main axes of the image.

8. The method according to claim 1, characterized by, before the back projection, a selection of projections associated with said blocks which have non-zero values, whereby the back projections are only performed on said projections with non-zero values.

* * * * *